March 13, 1951  J. O'DONNELL  2,545,301

SEWAGE DISPOSAL EQUIPMENT

Filed June 19, 1948

JAMES O'DONNELL
INVENTOR.

By Luther L. Mack

ATTORNEY.

Patented Mar. 13, 1951

2,545,301

UNITED STATES PATENT OFFICE 2,545,301

SEWAGE DISPOSAL EQUIPMENT

James O'Donnell, Los Angeles, Calif.

Application June 19, 1948, Serial No. 34,075

7 Claims. (Cl. 210—6)

My invention relates to equipment for the treatment of sewage and waste, particularly from human habitations, and has for its general object to provide simple permanently installed and low cost equipment by means of which waste water from the kitchen sinks as well as sewage from the toilets and dirty bath water from the bathrooms of one or more dwelling units may be treated without the use of any chemicals to make it suitable for irrigation use or if not required for such use, may be run off through any usual channels in a clear odorless and harmless flow.

In many areas of the United States and other countries the pollution of water bearing soil in which wells are sunk or of streams, lakes, and ocean into which waste from human habitations is commonly dumped has caused serious damage, or risk thereof, not only to human beings but also to wild life such as fish and shell fish which are likely to be killed or become dangerous as food, unless such waste liquids are thoroughly treated by sewage disposal systems. Such systems, however, are often inadequate, faulty in operation, or entirely dispensed with especially in impoverished areas.

In addition to the dangers caused by improper disposal of sewage there are many areas which, while otherwise suited to settlement and agriculture, are poorly supplied with water, and it is important that no wastage of water should be allowed, yet large quantities of water are at present wasted in the form of sewage which by the use of my invention could be utilized for watering land.

It is an object of my invention to provide sewage conversion equipment which may be installed adjacent and to serve one or more dwellings at a cost much less than that of providing the usual sewers and sewage disposal systems where a large number of dwellings is to be serviced, or the cost of the usual cesspool or septic tank arrangement where only one or two dwellings are concerned.

It is a further object of my invention to provide sewage disposal equipment which will provide odorless, clear, and safe water fit for watering vegetation from household sewage, which requires little maintenance and supervision and is simple and long wearing in construction.

A still further object of my invention is to provide a disposal system by which the waste water from dwellings as well as their sewage is rendered into irrigation water or may be disposed of in the ground or run into bodies of water without danger of contamination of ground water or of contaminating the body of water into which it is discharged.

Yet another object of my invention is to provide a sewage disposal system for household sewage and household waste water which subjects the sewage to a double treatment to ensure that it is completely innocuous for use as irrigation water or when disposed of.

It is a further object of my invention to provide sewage processing equipment receiving sewage from two separate sources and processing the sewage separately and collectively before finally discharging it as clear water.

Still further features and objects of my invention will hereinafter appear from the following specification taken in conjunction with the accompanying drawings which illustrate a preferred embodiment of the invention, but it is to be understood that various changes and modifications of parts may be made by those skilled in the art without departing from the scope of the invention as defined by the appended claims.

Figures 2, 3:
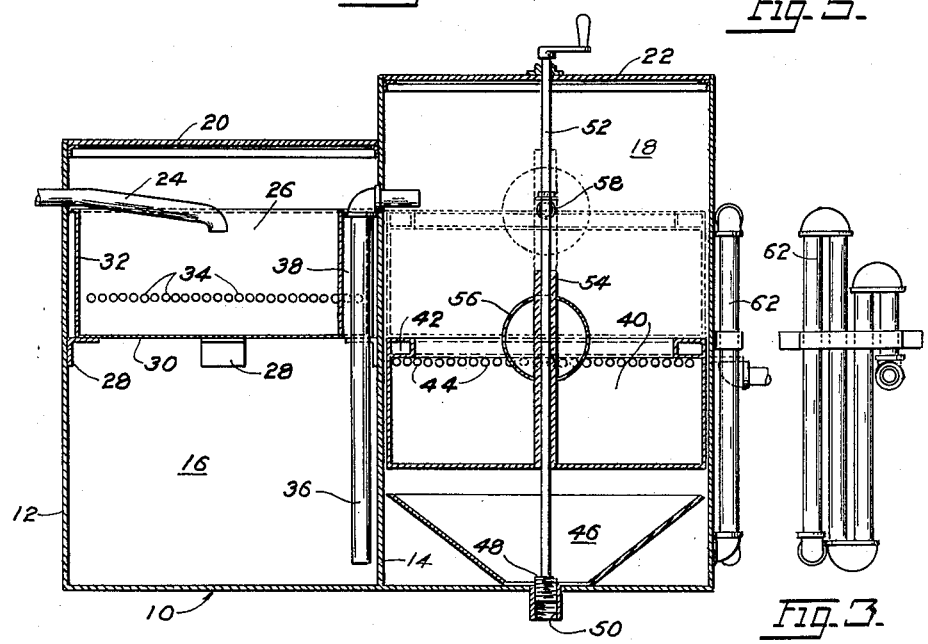
Fig. 2 is a central vertical section through the equipment.
Fig. 3 is a detail elevational view of a syphon forming part of my installation, as seen looking in the direction of the arrows 3 in Fig. 2.

Referring now to Fig. 2, the numeral 10 indicates generally a pair of tanks which, while they may be separate, are preferably formed in a single rectangular casing 12 by a partition 14 extending across the casing.

One tank 16 receives the sewage from the toilets of the dwelling while the other tank 18 receives water from the bathtubs and wash basins and also the discharge from the kitchen sinks, the grease trap being assumed to be positioned in the discharge line ahead of its inlet into tank 18.

Although both tanks are formed in one casing, I prefer to form tank 18 of greater height than tank 16 as shown in Fig. 2, and to provide each tank with a lid or cover 20 and 22 shown as extending across the full width of the tanks though obviously the tanks may be formed with top walls with covered manholes provided therein. The tank covers are removable but of gas-tight construction.

Turning now to the specific description of tank 16, an inlet pipe 24 from the household toilets extends into the tank and is provided with a downturned inlet end arranged to be submerged after the first few discharges through pipe 24, some distance below the level of the liquid in said tank by level maintaining means later described.

A receiving trap 26 is arranged toward the top of the tank on spaced supporting brackets 28 which may be welded to the inside of tank 16. The trap is provided with an imperforate bottom 30 and vertical sides 32 spaced slightly from the wall of tank 16 around the entire periphery of the trap. A line of relatively small openings 34 through the wall of the receptacle extends all around the receptacle toward the bottom thereof.

The purpose of the trap is to maintain all solids contained in the sewage at the upper portion of tank 16 where decomposition with resultant heat takes place. The solids remain on the surface when received and break up. A small amount sinks to the bottom of the trap but breaks up and rises as gases are formed therein as a result of decomposition, the resultant liquids escaping into the tank through the relatively small openings and flowing downwardly between the walls of the trap and of the tank.

An escape pipe 36 is arranged vertically with its lower open end adjacent the bottom of the tank and extending upward through a vertical trough 38 formed in the wall of the trap and closely surrounding the pipe.

The delivery end of the pipe 36 is passed through the wall of the tank 16 into tank 18 at a height sufficient to ensure that the outlet end of pipe 24 is always immersed, thus preventing gases of decomposition, which collect above the open top of the trap 16 from passing into the inlet pipe.

The volume of sewage to be treated in tank 16 will determine its actual size, the drawings showing an arrangement suitable for an average dwelling. If the sewage from a hotel or camp is to be treated the tank 16 would be made longer, the general arrangement of the parts remaining the same however. The simple construction of my sewage treatment equipment enables tanks of varied capacity to be readily produced to treat the amount of sewage to be expected for the particular type of habitation being served.

Tank 18 is provided with a floating trap 40 having a hollow rim 42 and receiving the fluids discharged from pipe 36. The purpose of the floating trap is to maintain all sewage solids contained in the discharge from pipe 24 in the zone of most active bacterial decomposition and by providing the relatively shallow floating receptacle any solids that may sink to the bottom of the trap 40 break up by chemical and bacterial decomposition into fragments small enough to be raised by the released gases, to the surface and subjected to the more intense action proceeding in the sludge floating on the surface and taking place under the heat developed by the putrefaction thereof. I have found this action to be so vigorous that no appreciable, if any, solids of non-decomposable character are floated out of small orifices 44 arranged as a continuous series just below the upper edge of the floating receptacle and are so small that they work down between the wall of the trap 40 and the wall of the tank 18 and collect in the funnel 46 arranged at the bottom of the tank from which they may be flushed from time to time by unscrewing a plug 48 fitted into a threaded vent 50. The plug or any other suitable type of valve, is operated by a rod 52 passing through a vertical tube 54 welded or otherwise secured in fluid tight relation to the bottom of the trap. The construction of this element of my invention is fully disclosed in Patent No. 2,420,326, issued to me May 13, 1947, to which reference may be had for further details. In the drawings I have shown additional floatation means for trap 40 in the form of a metal sphere 58 welded to the vertical tube, supplementary buoyancy being provided since in addition to the discharge from tank 16, tank 18 receives household waste water from the bathtubs, wash basins, and kitchen sinks of the dwellings serviced.

Figure 1:
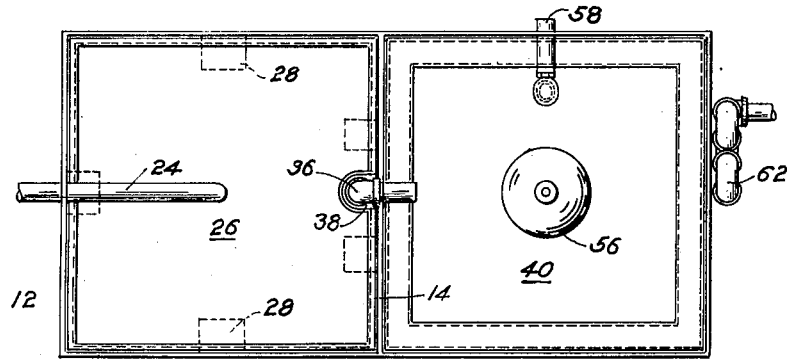
Fig. 1 is a plan view of the installation of my invention with covers removed to show the interior arrangement.
Figures 4, 5:
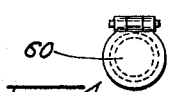
Fig. 4 is a detail view showing in front elevation a one-way valve controlling one inlet in my apparatus.
Fig. 5 is a side elevation of the valve shown in Fig. 4.

The household waste water after traversing the usual grease trap fitted to household sewers is discharged into tank 18 by inlet pipe 58, shown in detail in Fig. 5. The inlet pipe discharges above the top rim of trap 40 through a flap valve 60 fitted to the end of the pipe and formed as a plate hinged at its top to the pipe and fitting against the forwardly sloped end of the pipe. The arrangement of flap valve 60 ensures that the waste water can flow easily into the tank and that the valve will by its weight securely close the end of the pipe against entry of gases from the tank when not opened by the waste water whenever water is not flowing from the pipe.

The level of sewage under treatment in tank 18 is maintained by the syphon 62 constructed as shown in Fig. 3, which is arranged vertically outside tank 18, thus leaving the interior of the tank entirely free for the vertical movement of the floating trap.

In producing equipment of larger size than the average size for a single family house illustrated in the drawings I prefer to increase the vertical height of tank 18 rather than its diameter.

It is to be understood that the tanks may be made of any suitable material, the shape shown being designed to be made of California redwood which I have found to be particularly long lasting when buried in soil which soon corrodes the usual iron septic tanks, whereas redwood will last many times longer in sound condition.

It is preferable that tank 18 be not less than six inches higher than tank 16 though it is immaterial how much higher it is than tank 16 thus enabling the cover 22 to be positioned at ground level to facilitate operation of rod 52 when required while enabling the tanks to be installed at a level such that the liquid level therein is below the depth of penetration of frost into the ground.

I claim:

1. Sewage treatment apparatus comprising: a first tank and a second tank; a trap in and extending across substantially the whole area of each tank, each trap having an open top, an imperforate bottom and imperforate sides except for a series of small holes extending through said sides intermediate the top and bottom thereof; an inlet pipe discharging sewage into the trap in the first tank below the level of the contents of the trap; an overflow pipe leading effluent from a point adjacent the bottom of said first tank into the second tank to a point above the trap in said second tank; a pipe delivering waste water into said second tank above the trap in said second tank; outlet valve means fitted to said waste water pipe and effective to prevent the entry of gas from the second tank into said pipe; means effective to discharge liquid from the second tank when a predetermined level has been reached therein; means enabling undissolved particles accumulated on the bottom of said second tank to be removed; and means for stationarily supporting the trap of the first tank in position near the top of said first tank while the trap of the second tank is buoyantly supported therein.

2. Sewage treatment apparatus comprising: a first vertical tank into which sewage is discharged; a fixed trap supported in the upper portion of said tank and having an open upper side, imperforate bottom, and side walls imperforate except for a series of small openings extending around and through the side walls intermediate the top and bottom of the trap, the upper edge of said trap closely fitting with the wall of the tank while the side wall of the trap below the upper edge is spaced from the wall of the tank; an inlet pipe for sewage extending into said tank above the trap and opening into a trap below the level of sewage held therein; an overflow pipe extending from a point adjacent the bottom of said tank to a height above the level of said inlet pipe and leading the effluent from said sewage through the wall of said tank; a second vertical tank into which waste water is discharged for treatment; a second trap in said second tank having an open upper side, imperforate bottom, and imperforate side walls, except for a series of small openings extending around and through the side wall of the second trap intermediate the top and bottom of said walls, the walls of said trap being closely adjacent the wall of the tank, the overflow pipe discharging into said second trap; an inlet pipe for waste water discharging into said second trap; means for automatically discharging liquid from said second tank when the level of liquid therein exceeds a predetermined level; means for removing any accumulation of undissolved particles from the bottom of said second tank; and removable gastight closure means for the top of both tanks.

3. Sewage treatment apparatus comprising: a first tank and a second tank; traps respectively, fixedly and buoyantly mounted in said tanks and extending across substantially the whole areas of the tanks, each trap having an open top, imperforate bottom, and imperforate sides except for a series of small holes extending through said sides intermediate the top and bottom thereof; brackets supporting the trap of the first tank in position; flotation means effective to support the trap of the second tank in the surface of the liquid contained therein; an inlet pipe discharging sewage into the trap in the first tank below the level of the contents of the trap; an overflow pipe leading effluent from adjacent the bottom of said first tank into the second tank above the trap in said second tank; a pipe delivering waste water into said second tank above the trap in said second tank; outlet valve means fitted to said waste water pipe and effective to prevent the entry of gas from the second tank into said pipe; means effective to discharge liquid from the second tank when a predetermined level has been reached therein; means enabling undissolved particles accumulated on the bottom of said second tank to be removed; and a removable gastight closure means for both said tanks.

4. Sewage treatment apparatus comprising: a first tank and a second tank; traps in said tanks extending across substantially the whole areas of the tanks, each trap having an open top, imperforate bottom and imperforate sides except for a series of small holes extending through said sides intermediate the top and bottom of the trap in the first tank, and near the top of the trap in the second tank; an inlet pipe discharging sewage into the trap in the first tank below the level of the contents of the trap; an overflow pipe leading effluent from adjacent the bottom of said first tank into the second tank above the trap in said second tank; a pipe delivering waste water into said second tank above the trap in said second tank; outlet valve means fitted to said waste water pipe and effective to prevent the entry of gas from the second tank into said pipe; means effective to discharge liquid from the second tank when a predetermined level has been reached therein; means enabling undissolved particles accumulated on the bottom of said second tank to be removed; and a removable gastight closure means for both of said tanks.

5. Sewage treatment apparatus comprising: a first tank and a second tank; a trap in each tank extending across substantially the whole area of the tank, each trap having an open top, imperforate bottom and imperforate sides except for a series of small holes extending through said sides intermediate the top and bottom thereof; an inlet pipe discharging sewage into the trap in the first tank below the level of the contents of the trap; an overflow pipe leading effluent from adjacent the bottom of said first tank into the second tank above the trap in said second tank; a pipe delivering waste water into said second tank above the trap in said second tank; outlet valve means fitted to said waste water pipe and effective to prevent the entry of gas from the second tank into said pipe; a syphon arranged outside said second tank and having its inlet end communicating with the interior of the second tank toward the bottom thereof and effective to discharge liquid from the second tank when a predetermined level has been reached therein; means enabling undissolved particles accumulated on the bottom of said second tank to be removed; and a removable gastight closure means for both said tanks.

6. Sewage treatment equipment comprising: a first vertical tank, a trap closely fitting within the upper portion of said tank and having an imperforate bottom and sides except for small holes extending through the latter intermediate the height thereof; means supporting the trap in fixed position in the first tank, conduit means for discharging sewage into said trap below the level of sewage held therein; a gastight removable closure for the top of said tank; an overflow pipe leading effluent from adjacent the bottom of said tank through the wall thereof at a level above the opening of said sewage inlet pipe; a second vertical tank into which waste water is discharged; a second trap buoyantly supported in said second tank, the effluent from the first tank discharging from said overflow pipe into said second trap, said second trap having an open upper side, imperforate bottom and side walls imperforate except for a series of small openings extending around and through the side wall of the trap intermediate the top and bottom of said side walls, the side walls of said second trap being closely adjacent the wall of the second tank; means maintaining the level of the effluent and waste water in said second trap in the surface of the liquid contained in the second tank; a pipe discharging waste water into said second trap; a substantially gastight outlet valve for the waste water pipe; means for automatically discharging liquid from said second tank when the level of liquid therein exceeds a predetermined level; means for removing any undissolved particles from the bottom of said second tank; and a removable gastight closure for the top of said second tank.

7. Sewage treatment equipment comprising: a first vertical tank, a trap closely fitting within the upper portion of said tank and having an imperforate bottom and sides except for small holes extending through the latter intermediate the height thereof; conduit means for discharging sewage into said trap below the level of sewage held therein; a gastight removable closure for the top of said tank; an overflow pipe leading effluent from adjacent the bottom of said tank through the wall thereof at a level above the opening of said sewage inlet pipe; a second vertical tank; an inlet pipe for delivering waste water extending into said second tank, said waste water inlet pipe having a downwardly and outwardly sloped end; a plate hinged at its upper end to the top of the waste water inlet pipe end and seating on the inclined end of the pipe to permit free exit of waste water but to prevent entry of gases from the second tank into said pipe; a second trap in said second tank, the effluent from the first tank and from the waste water pipe discharging into said second trap, said second trap having an open upper side, imperforate bottom, and sides imperforate except for a series of small openings extending around and through the sides of the trap intermediate the height of said walls, the sides of said trap being closely adjacent the wall of the tank; means for automatically discharging liquid from said second tank when the level of liquid therein exceeds a predetermined level; means for removing any undissolved particles from the bottom of said second tank; and a removable gastight closure for the top of said second tank.

JAMES O'DONNELL.

REFERENCES CITED

The following references are of record in the file of this patent:

UNITED STATES PATENTS

| Number | Name | Date |
|---|---|---|
| 1,120,351 | Weston | Dec. 8, 1914 |
| 1,148,500 | Caverno | Aug. 3, 1915 |
| 1,204,534 | Andrews | Nov. 14, 1916 |
| 2,262,576 | Durdin, Jr. | Nov. 11, 1941 |
| 2,279,813 | Bent | Apr. 14, 1942 |
| 2,420,326 | O'Donnell | May 13, 1947 |